US005718842A

United States Patent [19]
Papkovsky et al.

[11] Patent Number: 5,718,842
[45] Date of Patent: Feb. 17, 1998

[54] LUMINESCENT DYE COMPRISING METALLOCOMPLEX OF A OXOPORPHYRIN

[75] Inventors: Dmitri Boris Papkovsky; Gelii Vasilii Ponomarev, both of Moscow, U.S.S.R.

[73] Assignee: Joanneum Reserach Forschungsgesellschaft mbH, Graz, Austria

[21] Appl. No.: 790,489

[22] Filed: Jan. 29, 1997

Related U.S. Application Data

[63] Continuation-in-part of Ser. No. 541,932, Oct. 10, 1995, abandoned.

[30] Foreign Application Priority Data

Oct. 7, 1994 [EP] European Pat. Off. ............... 94890162

[51] Int. Cl.[6] ............... C09K 11/06; C07D 487/22; G01N 21/64
[52] U.S. Cl. ............... 252/301.16; 252/301.35; 250/459.1; 436/138; 436/136; 436/172; 436/178
[58] Field of Search ............... 250/459.1; 436/138, 436/136, 172, 178; 252/301.16, 301.3

[56] References Cited

U.S. PATENT DOCUMENTS

| 4,003,707 | 1/1977 | Lübbers et al. | 23/232 R |
|---|---|---|---|
| 4,476,870 | 10/1984 | Peterson et al. | 128/634 |
| 4,810,655 | 3/1989 | Khalil et al. | 436/138 |

FOREIGN PATENT DOCUMENTS 2132348   7/1984   United Kingdom .

OTHER PUBLICATIONS

Chang et al, "Differebtiation of Bacteriochlorin and Isobacteriochlorine Formed by Metallation. High Yeild Synthesis of Porphyrindiones via OsO Oxidation", Chem.Comm., No. 15, Aug. 1986, pp. 1213–1215.

Stolzenberg, "Aggregation of Metallo–β–oxoporphyrines", Inorg. Chim. Acta., vol. 138(b21), No. 1, Sep. 1987, pp. 1–4.

Stolzenberg et al, "Structure, reactivity, and Electrochemistry of Free–Base β–OxoPorphyrins and Metallo–β–oxoporphyrins", Inorg. Chem., vol. 25(7), Mar. 1986, pp. 983–991.

*Primary Examiner*—Melissa Bonner
*Attorney, Agent, or Firm*—Watson Cole Stevens Davis, P.L.L.C.

[57] ABSTRACT

New luminescent dye including a metallocomplex of an oxoporphyrin having the general formula:

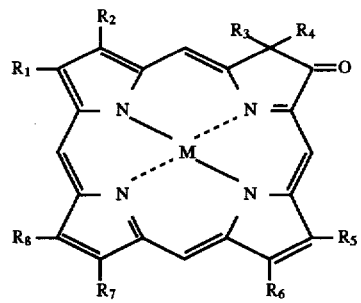

wherein R1 to R8 are radicals belonging to the group: H, lower alkyl with number of $C \leq 6$ or $CH_2$—$CH_2$—COO—$R_9$, with $R_9$=H or alkyl with number of $C \leq 18$ and $M=Pt^{2+}$ or $Pd^{2+}$.

20 Claims, 10 Drawing Sheets

LUMINESCENT DYE COMPRISING METALLOCOMPLEX OF A OXOPORPHYRIN

CROSS REFERENCE TO RELATED APPLICATION

This application is a continuation-in-part of application Ser. No. 08/541,932, filed Oct. 10, 1995, now abandoned.

FIELD OF THE INVENTION

The invention relates generally to the chemistry and luminescence spectroscopy of the porphyrin-like compounds and their application to measurement of oxygen concentration which is based on the quenching of luminescence of such compounds in certain solid-state compositions and coatings. The invention can be used for example in biotechnology, medicine and medical diagnostics, industrial and environmental monitoring.

BACKGROUND OF THE INVENTION

A variety of analytical systems utilize luminescent compounds as sensitive and specific probes for particular analytes (see e.g., U.S. Pat. Nos. 4,003,707 and 4,476,870). Fluorescent dyes are the most extensively developed and commonly used now, while the library of phosphorescent probes is much smaller.

Most luminescent aromatic dyes phosphoresce only at low temperatures (77K.). Very few are known to display significant phosphorescence at room temperature (RTP) in solutions and solid-state compositions.

Phosphorescent dyes, due to their long-decay emission and longwave well-resolved spectral bands, are promising for sensitive luminescent probing, e.g., labeling of biomolecules for immunoassays, and some specific applications, such as, studies of slow dynamic processes in biological systems and quenched-luminescence measurements.

Porphyrin compounds, mainly platinum(II) and palladium (II) complexes of porphyrins are among the most bright organic RTP dyes known for today (see, e.g., U.S. Pat. No. 4,810,655 and GB 2 132 348). They have intense and characteristic UV and visible absorbance bands and red emission. Phosphorescence quantum yields may be as high 20–50% and lifetimes range 0.1–1 ms, respectively. Some related structures, such as Pt- and Pd-complexes of chlorines, bacteriochlorines are also known as good RTP emitters. Compared to the above porphyrin phosphors, they have more longwave spectral characteristics, but their main drawback is bad photo- and chemical stability. These dyes usually undergo fast chemical degradation in the presence of oxygen, especially under illumination.

Molecular (triplet) oxygen is a strong quencher of luminescent dye molecules. Oxygen is one of the main objects to be monitored. It is also a substrate of a variety of important enzymatic reactions and living processes. They also can be monitored and quantified by measuring of oxygen consumption.

The effectiveness of quenching is determined either by duration (i.e., lifetime) of luminescence, intensity or nature of the dye and medium in which the quenching is measured. By selecting a suitable dye and matrix for it (i.e., oxygen probe), one can perform precise quantification of oxygen in the sample by means of luminescence.

Quantification of oxygen by quenching of luminescence could be performed by measuring either integral signal (intensity) or decay characteristics of luminescent oxygen probe. The second approach is much less dependent upon fluctuations of the dye concentration and drift of optical system components and, hence preferred.

In those cases, when continuous on-line monitoring of oxygen is needed, special analytical systems and devices—sensors and biosensors are effective. A number of approaches development of luminescence sensors for oxygen and derived enzymatic biosensors have been proposed (M. C. Moreno-Bondi, O. S. WOLFBEIS, M. J. P. Leiner, B. P. H. Schaffar, Oxygen optode for use in a fibre-optic glucose biosensor, Anal. Chem., 62 (1990) 2377–2380).

Polymer compositions on the basis of luminescent dyes, which are permeable for oxygen present in the sample, are typically used as active element. The latter is prepared in the form of coating (oxygen membrane) and applied or fixed at the end of optical fiber or in certain analytical cell. A number of luminescent oxygen probes have been proposed which use luminescent dyes, such as, fluorescent polycyclic aromatics (pyrene, decacyclene, their derivatives, etc.), fluorescent complexes of ruthenium ($Ru(bpy)_3$, $Ru(phen)_3$, etc.), phosphorescent porphyrin complexes embedded in a suitable plastic.

Most oxygen probes presently used have serious practical drawbacks and limitations. The following can be mentioned:

complex (multi-exponential) luminescence decay, which is typically short-decay (nanosecond range), not easy for the lifetime-based sensor realizations;

complex calibration for oxygen (non-linear Stern-Volmer plots);

shortwave absorbance bands, weak luminescent signals, bad spectral compatibility with semiconductor optoelectronic materials not allow to realize LED-photodiode based fibre-optic measurement device;

complex photophysics, temperature effects, stability characteristics, etc.

As a result, these systems make difficult creation of effective, while rather simple and cheap fiber-optic oxygen sensors for routine practical applications.

SUMMARY OF THE INVENTION

New phosphorescent porphyrin-like dyes are disclosed designed for particular use in luminescent oxygen sensors. The present invention is designing of the new phosphorescent dyes, considered as derivatives of the porphyrin metallocomplexes (mainly, Pt- and Pd-complexes)—the oxoporphyrins, which have advanced phosphorescent characteristics. This part includes description of synthetic part and investigation of the phosphorescent properties of the new compounds with the view of application to quenched-phosphorescence measurement of oxygen concentration.

Another goal of the present invention is the development of active elements on the basis of the noted new phosphorescent dyes. This relate mainly to the solid-state phosphorescent oxygen-sensitive polymer compositions (oxygen membranes and film coatings) as well as enzymatic membranes. The latter comprise the oxygen-sensitive composition coupled with oxygen-dependent enzyme(s). These active elements having advanced working characteristics and good compatibility with semiconductor optoelectronic materials proved to be effective for detection of oxygen and/or biologically active compounds (metabolites) in liquid and gas samples and for creation of corresponding measurement devices.

Another goal of the invention is to provide a new method for measuring oxygen concentration which is based on application of the new phosphorescent dyes, active elements on their basis, lifetime-based sensing approach and semiconductor optoelectronic components. Corresponding fibre-optic LED-photodiode luminescence lifetime-based oxygen sensor is described.

DETAILED DESCRIPTION OF THE PREFERRED EMBODIMENT

The new phosphorescent porphyrin-like dyes are synthesized by means of selective chemical modification of the porphyrin macrocycle. Modification is performed as follows. One double bond of the porphyrin macrocycle, which is not involved in a 18-Π-electron aromatic system, is partially oxidized and then treated in such a manner as to introduce keto-group in the macrocycle—i.e., to obtain the oxoporphyrin (or oxo-chlorine). Then the metallocomplex of the oxoporphyrin is obtained (mainly, $Pt^{2+}$-, $Pd^{2+}$- and $Zn^{2+}$ complex) which have the general structure:

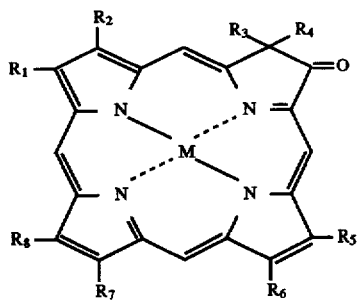

wherein R1 to R8 are radicals belonging to the group: H, lower alkyl ($C \leq 6$: methyl, ethyl, propyl, butyl, pentyl and hexyl) or $CH_2$—$CH_2$—COO—$R_9$, with $R_9$=H or alkyl ($C \leq 18$: methyl, . . . , octyl, . . . , decyl, . . . , dodecyl, . . . , octadecyl) and M=$Pt^{2+}$, $Pd^{2+}$ or $Zn^{2+}$.

The example of synthesis of the new Phosphorescent dyes—$Pt^{2+}$-, $Pd^{2+}$ and $Zn^{2+}$-complexes of the porphyrinketons is demonstrated by general scheme presented below:

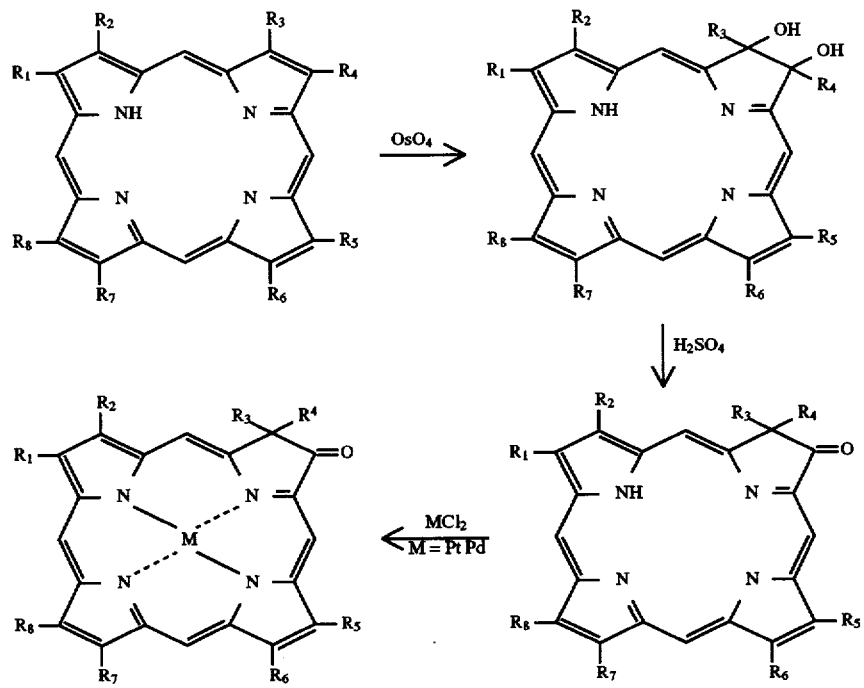

This procedure produces oxoporphyrin complexes which are highly phosphorescent at room temperature. Their spectral characteristics appear to be significantly longwave-shifted in comparison with the corresponding porphyrin dyes, while photo- and chemical stability remain rather good. Moreover, it discovered that the new compounds are highly stable to oxidation with ambient oxygen and photobleaching. Photochemical stability of the new dyes appears to be several times better then that of corresponding phosphorescent porphyrin dyes.

Electronic structure of the oxoporphyrins (they can be also called oxo-chlorines) and their metallocomplexes display close similarity with corresponding chlorine compounds. This fact provides similarity in electronic spectra: absorbance and emission spectra of the oxoporphyrin and chlorine compounds are very close. On the other hand, chlorines which might be considered as "reduced porphyrins", and oxoporphyrins—"oxidized porphyrins"—have strictly different chemical structures and physical properties. In particular, large differences in photo- and chemical stability characteristics are seen. Chlorine compounds are typically much more unstable even than porphyrins and undergo fast degradation in the presence of oxygen. Metallocomplexes of the porphyrin-diols (intermediate compound II in synthesis of the oxoporphyrins) and their complexes are also (photo)chemically unstable. Such phosphorescent dyes are weakly efficient within the framework of the present invention.

The described procedure for designing new phosphorescent dyes cannot be considered as an obvious way of synthesis of new dyes with shifted spectral characteristics. In particular, this could not be related to a common way of modification of the spectral characteristics of the dyes by means of introducing corresponding substituent(s) into its structures (such as e.g., synthesis of poly-fluorinated porphyrin-derivatives). In the present case changes in the whole electronic structure of the resulting compound are dramatic and result in large spectral changes and shifts. In addition, in the case of room temperature phosphorescence which is characterized by very fine photophysics, any structural modification may result in dramatic loss of efficiency of phosphorescence. Thus, further oxidation of the oxoporphyrins into porphyrin-diketons performed resulted in further longwave spectral shifting, but phosphorescence of the resulting complexes was very weak: 30–100-times weaker than for corresponding porphyrin and oxoporphyrin complexes.

So, the new compounds—phosphorescent dyes—discovered in the present invention have characteristic structural, physical and optical properties which distinguish them from the known dyes, i.e., a new class of phosphorescent dyes has been developed.

The new compounds thus obtained have bright phosphorescence at room temperature in solutions and solid-state compositions. Phosphorescence efficiency and lifetime characteristics of complexes of the oxoporphyrins appear to be close to that of corresponding porphyrin complexes, while electronic spectra (both excitation and emission) are significantly longwave-shifted. For the longwave absorbance band spectral shift is about 50–60 nm. Phosphorescence spectra also appear to be longwave-shifted for more than 100 nm. In particular, Pt-complexes of the oxoporphyrins have longwave excitation maximum at 592 nm and emission maximum at 760 nm. Due to long luminescence lifetimes (60 µm in absence of oxygen), the luminescence measurement is advantageously conducted in pulsed mode with time resolution.

Like for the porphyrin complexes, absorbance (and excitation) and emission bands of corresponding Pd-complexes of the oxoporphyrins also appear to be longwave-shifted for 10–30 nm. They are also less bright phosphors and have longer lifetimes. Metallocomplexes of the oxoporphyrins with different side substituents (R1–R9), also have very similar phosphorescent properties. The introduction of different side substituents may be necessary to vary the physico-chemical properties of the dye, e.g., to achieve solubility in water or various hydrophobic polymer matrices.

Main optical properties of the new dyes are summarized comparatively in Table 1 and 2 (see pages 11, 12).

The features mentioned in Tables 1 and 2 make the new dyes highly suitable for particular use in quenched-luminescence oxygen sensors and more advantageous than the corresponding phosphorescent porphyrins.

By the same method as for synthesis of the platinum(II) and palladium(II) complexes, zinc(II) oxoporphyrin complexes may be obtained. Again, in the general structure for the oxoporphyrin complexes $R_1$ to $R_8$ are radicals belonging to the group: H, lower alkyl or $CH_2$—$CH_2$—COO—$R_9$, with $R_9$=H or alkyl. In contrast to the Pt(II) and Pd(II) complexes, the zinc(II) complex shows a strong fluorescence, weak delayed fluorescence and weak phosphorescence emission. For Zn(II) octaethylporphine-keton or Zn(II)—octaethyloxoporphyrin, the lifetime of the fluorescence is about 10 ns only, but the luminescence decay times of the delayed fluorescence and the phosphorescence are 3.9 µs in micellar sulfite solution. This is almost an order of magnitude higher than for the Pd(II)complex. Correspondingly, the dye displays very high sensitivity to luminescence quenching by molecular oxygen and should be suitable for trace oxygen analysis. However, its phosphorescence quantum yield is very much lower than for the Pd(II) complex.

TABLE 1

Absorbance data for the oxoporphyrin free bases and their platinum(II), palladium(II) and zinc(II) complexes.

| Compound | Solvent | B(0,0) maximum [nm] | B(0,0) halfwidth [nm] | B(0,0) extinction coefficient [cm$^{-1}$ M$^{-1}$] | Q(0,0) maximum [nm] | Q(0,0) halfwidth [nm] | 0(0,0) extinction coefficient [cm$^{-1}$ M$^{-1}$] |
|---|---|---|---|---|---|---|---|
| Pt(II) octaethylporphin-keton | CHCl$_3$ | 398 | 31 | 86200 | 592 | 14 | 55100 |
| | MSS* | 396 | 28 | | 589 | 13 | |
| | polystyrene | 398 | 31 | | 592 | 14 | |
| Pt(II) coproporphyrin I-keton, tetraethylester | CHCl$_3$ | 397 | 36 | 82700 | 592 | 17 | 45700 |
| | MSS* | 397 | 35 | | 589 | 15 | |
| Pt(II) coproporphyrin I-keton | CH$_3$OH | 394 | 38 | | 588 | 18 | |
| | MSS* | 397 | 40 | | 591 | 18 | |
| Pd(II) octaethylporphin-keton | CHCl$_3$ | 410 | 34 | 82600 | 603 | 15 | 53500 |
| | MSS* | 408 | 34 | | 600 | 12 | |
| | polystyrene | 410 | 34 | | 602 | 14 | |
| Pd(II) coproporphyrin I-keton | CH$_3$OH | 406 | 42 | | 599 | 19 | |
| | MSS* | 410 | 40 | | 602 | 19 | |
| Zn(II) octaethylporphin-keton | CHCl$_3$ | 422 | 19 | 170000 | 622 | 14 | 52100 |
| | CHCl$_3$ + Py** | 428 | 15 | 187900 | 626 | 14 | 48600 |
| | MSS* | 422 | 18 | | 622 | 14 | |
| octaethylporphin-keton | CHCl$_3$ | 408 | 32 | 151000 | 642 | 12 | 30400 |
| coproporphyrin I-keton | CH$_3$OH | 400 | 40 | | 640 | 12 | |

*Micellar sulfite solution (5% Triton X-100; pH 7.0);
**pyridine
Note that Q(0,0) is an apsorption band (electronic origin of the lowest energy excited singlet state) an can range from 570 to 650 nm, and B(0,0) is an absorption band (origin ot the second excited state; Soret band).

TABLE 2

Luminescence emission data for the oxoporphyrin complexes at 22° C.

| Compound | Solvent | Q(0,0) maximum [nm] | Q(0,0) halfwidth [nm] | T(0,0) maximum [nm] | T(0,0) halfwidth [nm] | Quantum yield | Lifetime [µs] |
|---|---|---|---|---|---|---|---|
| Pt(II) octaethylporphin-keton | MSS* | | | 758 | 20 | 0.12 | 60.0 |
| | polystyrene | | | 759 | 19.5 | | 61.4** |
| Pt(II) coproporphyrin I-keton, tetraethylester | MSS* | | | 760 | 31 | 0.11 | 49.7 |
| Pt(II) coproporphyrin I-keton | MSS* | | | 763 | 35 | 0.08 | 31.4 |
| Pd(II) octaethylporphin-keton | MSS* | | | 789 | 22 | 0.01 | 455 |
| | polystyrene | | | 790 | 21 | | 480** |
| Pd(II) coproporphyrin I-keton | MSS* | | | 793 | 35 | 0.008 | 237 |
| Zn(II) octaethylporphin-keton | CHCl3 | 628*** | 20 | | | 0.069 | |
| | toluene | 624*** | 16 | | | 0.088 | |
| | MSS* | 625*** | 19 | | | 0.065 | ca. 0.01 |
| | | 625**** | | | | <5 · 10$^{-4}$ | 3800 |
| | | | | 830 | | <5 · 10$^{-4}$ | 3800 |
| Octaethylporphin-keton | CHCl3 | 645*** | 15 | | | 0.29 | |
| | toluene | 646*** | 14 | | | 0.33 | |
| | MSS* | 646*** | 14 | | | 0.37 | |

*Micellar sulfite solution (5% Triton X-100; pH 7.0);
**–under nitrogen;
***short decay fluorescence;
****long decay fluorescence.

Note that Q(0,0) is an absorption band (electronic origin of the lowest energy excited singlet state), and T(0,0) is a luminescent band (phosphorescence emission from the triplet state) and can range from 700 to 850 nm.

BRIEF DESCRIPTION OF THE DRAWINGS

Reference is now made to the accompanying drawings in which.

DETAILED DESCRIPTION OF THE PREFERRED EMBODIMENTS

In particular, oxygen probes on the basis of the porphyrin platinum complexes, which are the most suitable for oxygen detection at physiological range (1–20% in air or 10–300 µM in liquid), are weakly compatible with existing semiconductor optoelectronics, mainly with light sources. Thus, narrow-band green and pure green LEDs (GAP, emission maxima 567 and 557 nm respectively) have low efficiency of excitation of Pt-porphyrins (having narrow absorbance band with maximum at 535 nm). While blue LEDs (SIC, broad band emission with maximum at 470 nm) have much lower light output compared to the visible light LEDs, their spectral overlapping with excitation spectrum of Pt-porphyrins being small. Pd-porphyrins have more optimal spectral characteristics and are better excitable with pure-green LEDs. But due to much longer decay times their phosphorescence is highly quenched with ambient air oxygen and phosphorescent signal is typically weak. They are not effective for oxygen detection in the physiological range, which is of main need.

Figure 3:
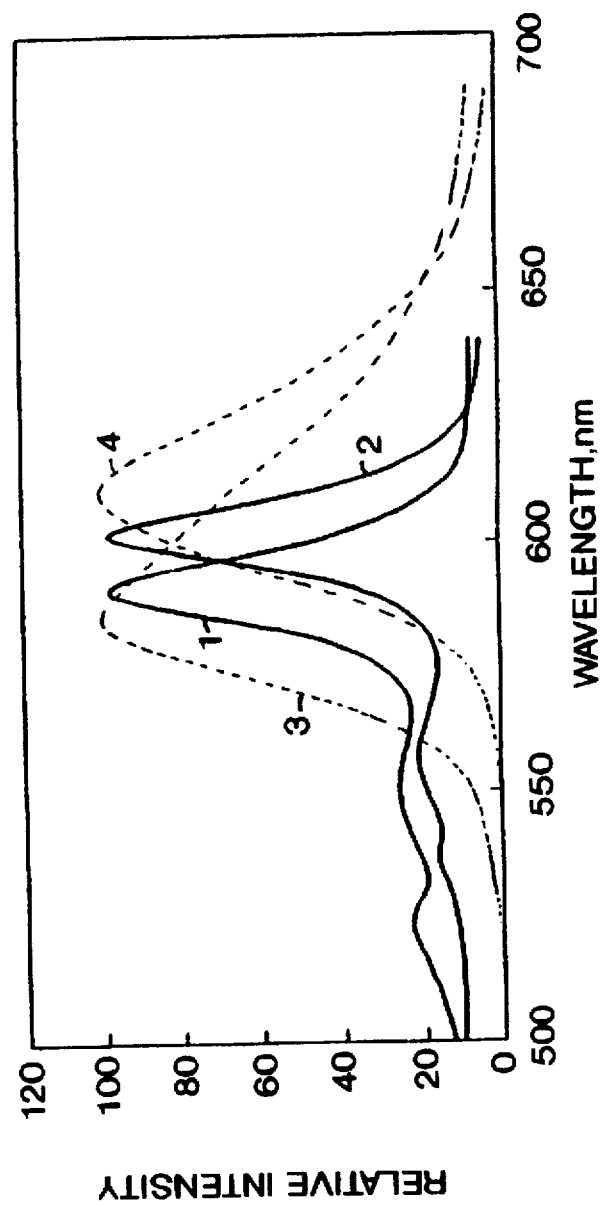
FIG. 3 shows spectral compatibility of the oxoporphyrin complexes with LED excitation: (1) platinum and (2) palladium complex of the oxoporphyrin, (3) yellow and (4) orange LED.
Figure 4A:
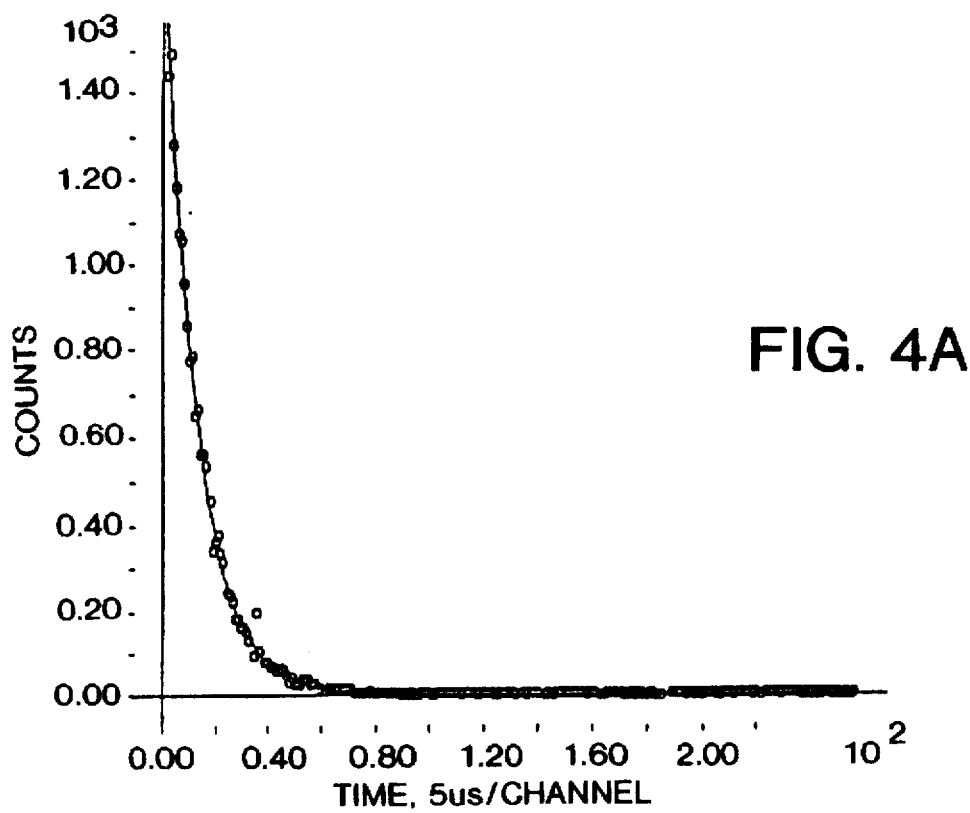
FIGS. 4a to 4d show kinetics of the phosphorescence decay for the compositions of octaethyloxoporphyrine complexes and polystyrene: (a) for platinum (II) complex in nitrogen (long-decay time region), (b) platinum (II) complex in nitrogen (short-decay time region), (c) platinum (II) complex in air, and (d) palladium (II) complex in nitrogen, with following conditions: 25° C., polymer/dye=100/1, excitation/emission 592/760 nm for platinum and 602/780 nm for palladium respectively.
Figure 4B:
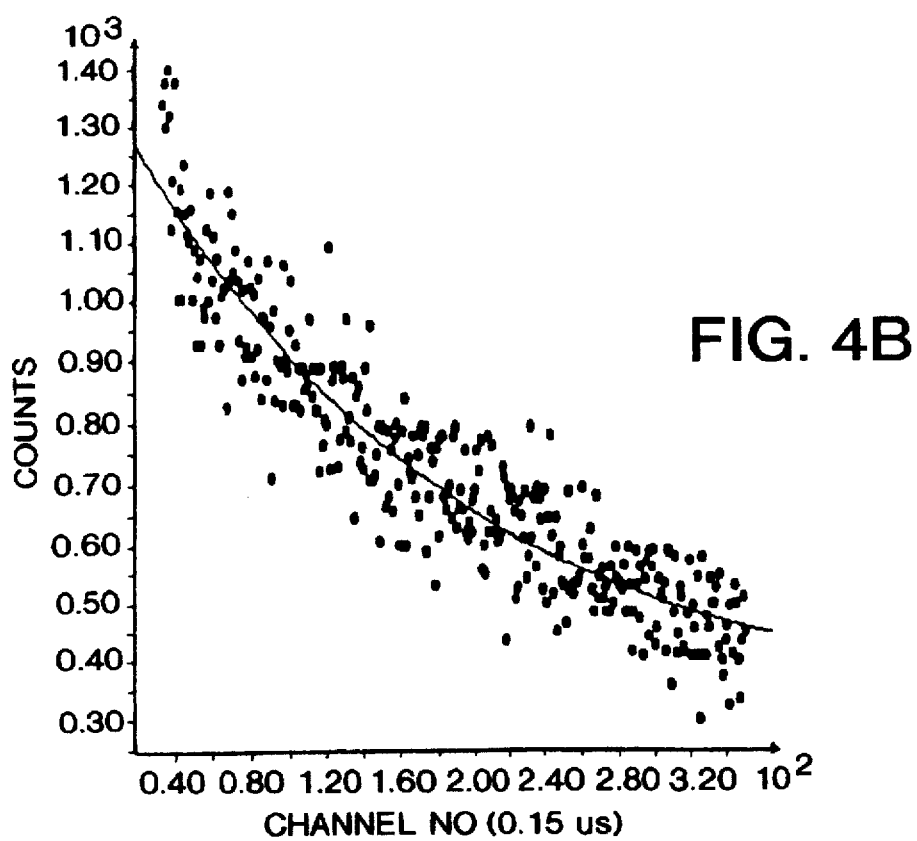
Figure 4C:
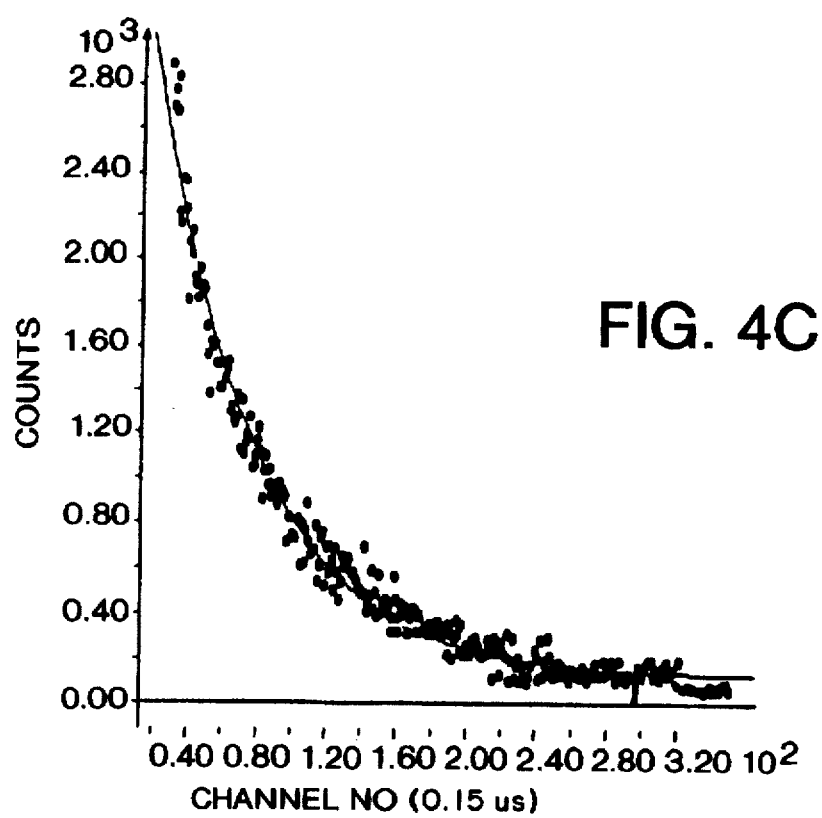
Figure 4D:
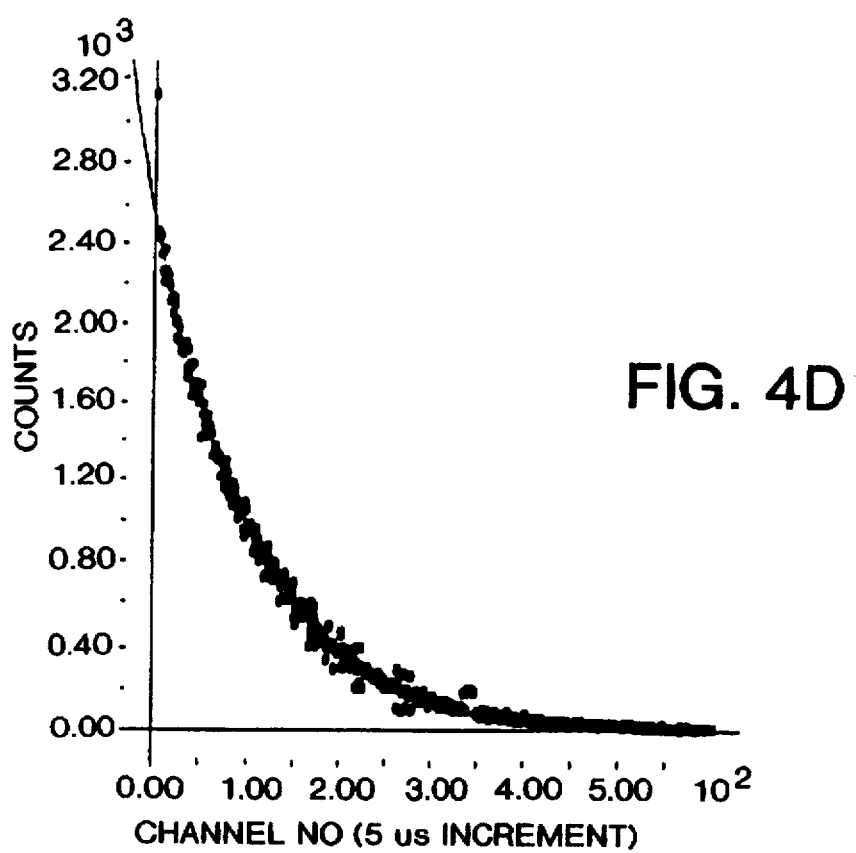

On the other hand, the new dyes of the present invention—the oxoporphyrin complexes—are highly compatible with LED excitation. Spectral overlapping of absorbance bands and emission of some custom LEDs is presented on FIG. 3. In particular, yellow LED (3) having emission maximum at 586 nm is quite efficient as a light source for excitation of platinum oxoporphyrin complexes (1), orange LED (4) for excitation of Pd-oxoporphyrin complexes (2). Good spectral resolution of excitation and red/near-infrared emission bands allow to use simple broadband optical filters for discrimination of the excitation and emission light, the latter could be detected sensitively with silicone photodiodes.

According to the above reasons, the new dyes should be effective for the development of advanced oxygen-sensitive materials. The present invention describes such materials which comprise compositions of the hydrophobic oxoporphyrin complex and polystyrene. The said compositions were designed and optimized for special use in the lifetime-based fibre-optic oxygen sensors. Those prepared on the basis of platinum complexes are effective for physiological range, whereas palladium complexes are more effective for low-oxygen range.

Besides using polystyrene as the polymer matrix, the new dyes may also be immobilized in polymers such as polyvinylchloride (PVC) or plasticized PVC, resulting in oxygen-sensitive membranes with different oxygen response characteristics. The solubility of the dyes in various polymer metrices other than polystyrene (e.g., silicone) may also be effectively governed by the choice of suitable side substituents $R_1$ to $R_9$.

In addition to the above mentioned LED-compatibility and good working characteristics, the new oxygen probes display a number of additional useful features. For, example, the phosphorescent oxygen-sensitive polymer compositions on the basis of metalloporphyrins described in patent U.S. Pat. No. 4,810,655 which use polychlorovinyl, polymethylmetacrylat with plastisizers as polymer matrix, were characterized by multi-exponential phosphorescence decay and complex calibration for oxygen. This complicates initial calibration, acquisition of experimental data and calculation of oxygen concentration.

The newly designed phosphorescent oxygen probes of the present invention—compositions of the oxoporphyrin complexes and polystyrene—were shown to be characterized by simple phosphorescence decay curves. This polymer, which was not studied in detail in the previous works on this item, was found to be quite optimal. It combines both rather good solubility for oxygen (moderate amplitude of quenching of about 4 times for nitrogen and ambient air), fast response (i.e., diffusion of oxygen), good compatibility with the dyes, mechanical properties, etc. Typical decay curves for PtOEP-keton-polystyrene film coatings and their fitting and linearization according to a single-exponential decay law are presented on FIGS. 4a to 4d. They prove the fact of homogeneity of population of the quenchable luminophore in the compositions. This, in turn, makes easy the procedure of lifetime measurements and data acquisition in the phosphorescence lifetime-based oxygen sensing approach. Another advantage is simple calibration for oxygen with good linearity in Stern-Volmer plots (To/T vs oxygen), see FIG. 5. For this case even single-point calibration is applicable.

Figure 6:
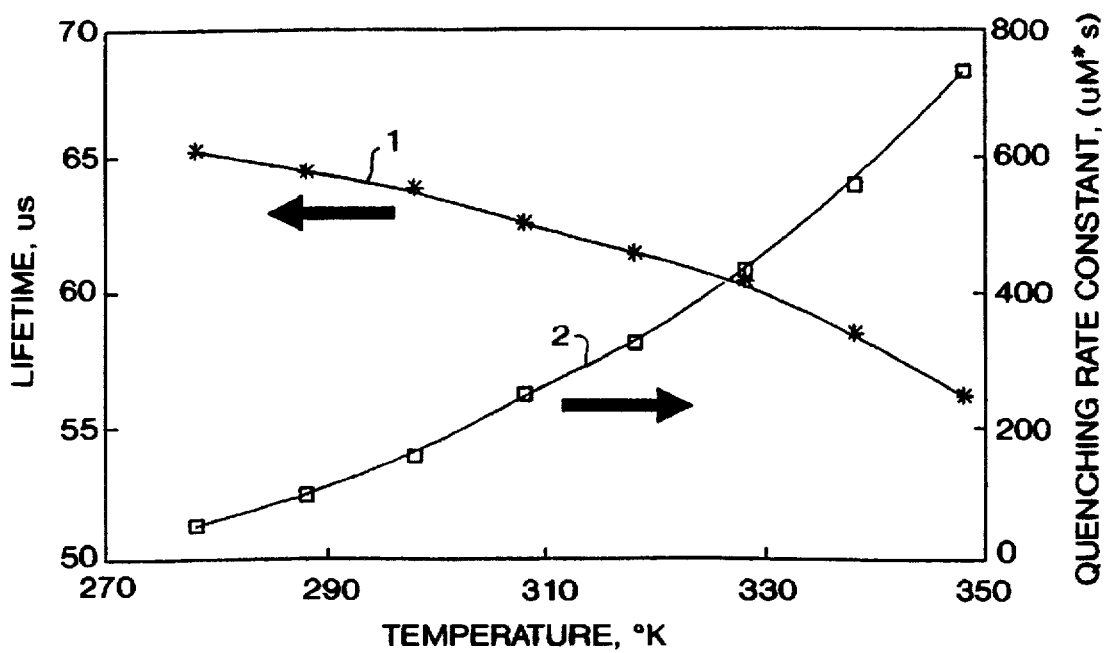
FIG. 6 shows the temperature dependences of the phosphorescence lifetime (1) and bimolecular quenching rate constant (2) for the platinum octaethyloxoporphyrine—polystyrene composition.

Simple phosphorescence decay and oxygen calibration also make temperature correction easy for the quenched-phosphorescence oxygen quantification. Temperature dependences for the non-quenched lifetime (1) and bimolecular quenching rate constant (2) are presented on FIG. 6.

Another advantage of the new oxygen probes is improved stability characteristics. Both photochemical and operational stability of the new oxygen-sensitive coatings was improved, and also long-term storage stability as well. In particular, under intense illumination photostability of the new oxygen probe was about 10-times higher than for the corresponding phosphorescent porphyrin oxygen probes. In addition the latter undergo significant chemical degradation of the dye during long-term storage (see FIG. 7, 1—freshly prepared, 2—stored for 1,5 years in a dark place at room tempr.), while the new ones are stable with time.

The new oxygen probe—platinum octaethyloxoporphyrine is more soluble in polystyrene than its analog—platinum octaethylporphine. In particular, for PtOEP-polystyrene system saturated proportion dye/polymer was found to be 3:100 (w/w), while for PtOEP-keton-polystyrene even at 1:10 no saturation with the dye was observed. Good solubility of the phosphorescent probe in the polymer matrix allow to improve specific phosphorescent signal of the oxygen probe and signal-to-noise ratio. For PtOEP-keton-polystyrene compositions thin film coatings (thickness 1–5 um) provide 50–95% efficient absorbance of the excited light at maximum of the longwave band (592 nm).

Oxygen sensor active elements are prepared in the form of thin film coatings applied onto a suitable solid support, at the end of a fibre optical catheter, special optical cell or other optical element of oxygen sensor. Such an active element being in diffusion contact (dipping or invasion) with gas or liquid sample gives the phosphorescent response which correlate with oxygen concentration in the sample. This phosphorescence response is used for oxygen quantification. Active elements (oxygen membranes and coatings) prepared on the basis of the phosphorescent polymer compositions (oxygen probes) according to the present invention characterized by intense signal, fast and reversible response to oxygen changes and simple oxygen quantification by lifetime measurements. They were effective in fibre-optic detection of oxygen in gas and liquid (aqueous) phases performed by phosphorescence intensity either lifetime measurements. A corresponding instrumentation—prototype LED-photodiode oxygen sensor—was developed.

Derived enzymatic sensing systems could be developed by coupling, a suitable oxygen-dependent enzyme or enzymatic system with the oxygen-sensitive element of the present invention. The procedure is performed by either immobilizing the enzyme directly on the surface of oxygen membrane using a suitable chemical or physical method or by constructing special analytical cells (e.g., flow-cell) containing specific oxidase enzyme as recognition system and oxygen membrane as a transducer. Such a system becomes sensitive to the enzyme substrate(s) which causes changes of the dissolved oxygen concentration at the oxygen membrane or in the whole sample volume. Changes in the dissolved oxygen concentration are monitored and quantified by phosphorescence measurements, phosphorescence response which is proportional to the substrate concentration is used for the substrate quantification in the sample.

In particular, preparation of glucose-sensitive active element on the basis of the platinum-octaethyl-oxoporphyrine—polystyrene oxygen membrane and glucose oxidase enzyme is described. In the similar manner other oxidase enzyme membranes, such as cholesterol oxidase, lactate oxidase, uricase, etc. could be prepared and used as active elements instead of oxygen or glucose membranes in the corresponding devices (biosensors) for determination of, respectively, cholesterol, lactate, uric acid.

New method for measuring oxygen concentration is based on application of the said new phosphorescent dyes, active elements (i.e., oxygen-sensitive polymer compositions) on their basis and semiconductor optoelectronics and phosphorescence lifetime-based oxygen sensing approach. LED-photodiode based optoelectronic scheme, which realize measurements of the phosphorescence quenching by means of phosphorescence intensity and/or lifetime with a suitable microsecond-range electronic time-logics, allow to perform precise quantification of oxygen in gas and liquid samples using predetermined calibration.

The following illustrative but nonlimiting examples further illustrate the invention.

EXAMPLE 1

Synthesis of Platinum(II) Octaethyloxoporphyrine or Octaethylporphine-Keton (Hydrophobic Dye)

Octaethylporphine (OEP, 100 mg) is oxidized with $OsO_4$ (200 mg) in chloroform (30 ml) for 24 hours. OEP-cis-diol formed is isolated and purified on a silicagel column in chloroform/ether system collecting the main fraction which is then concentrated by evaporation and crystallized from chloroform/methanol. Yield of OEP-cis-diol—about 40%. Then OEP-cis-diol is incubated for 10 minutes with concentrated sulfuric acid, after this the mixture is applied onto ice, neutralized with ammonia. The precipitate isolated and chromatographed on a column with silicagel in chloroform collecting the main fraction of OEP-keton. Yield is about 90%. Pure OEP-keton is boiled for 3 hours with 200 mg of $K_2PtCl_4$ in benzonitryle, then evaporated until dryness. The residue is dissolved in chloroform and chromatographed on a silicagel column in chloroform/acetone system collecting the main fraction. Thus 18 mg of Pt-OEP-keton is obtained after drying. Yield—about 60%.

CHN assay data for PtOEP-keton: Found, %: C—57.99; H—5.90; N—7.50. $C_{36}H_{44}N_4OPt$. Calculated, %: C—58.07; H—5.96; N—7.53.

EXAMPLE 2

Preparation of Pd-OEP-keton

OEP-keton (see example 1), 30 mg, is heated for 30 min at 110° C. with 100 mg of $PdCl_2$ in dimethylformamide, then cooled and metallocomplex precipitated with water. After filtering, crystallization from chloroform/methanol of the palladium complex of OEP-keton, 27 mg is obtained, yield being about 90%.

CHN-assay data for PdOEP-keton. Found, %: C—65.89; H—6.69; N—8.50. $C_{36}H_{44}N_4OPd$. Calculated, %: C—65.99; H—6.77; N—8.55.

EXAMPLE 3

Preparation of Platinum Coprooxoporphyrine or Coproporphyrin-Keton (Water-Soluble Dye) and its Tetraethyl Ester Tetraethyl ester of coproporphyrin I (CP1-TEE, $R_1=R_3=R_5=R_7=CH_3$, $R_2=R_4=R_6=R_8=CH_2—CH_2—COOH$) 100 mg, is processed as described in Example 1, but incubated with $OsO_4$ for 12 hours. Thus CP1-TEE-cis-diol obtained, yield being 30%. Then CP1-TEE-cis-diol incubated with sulfuric acid at 0° C. for 15 min, solution is applied onto ice and neutralized with ammonia. The precipitate if filtered, dryed and chromatographed. Yield of CP1-TEE-keton is about 75%.

CP1-TEE-keton, 20 mg, boiled for 1 hour with 150 mg of $K_2PtCl_4$ in benzonitrile and then evaporated. The residue is extracted with chloroform and chromatographed on a silicagel column in chloroform/ether system. Yield of Pt-CP1-TEE-keton is about 75%.

Pt-CP1-TEE-keton, 15 mg, is heated for 4 hours with 100 mg of KOH in dioxane. Then product precipitated with water, neutralized with HCl rinsed and filtered. Yield of Pt-CP1-keton about 100%.

EXAMPLE 4

Synthesis of Other Oxoporphyrin Complexes

Pd complexes of coproporphyrin I-keton and ist tetraethyl ester are synthesized from CP1-TEE-keton (see example 3) and $PdCl_2$ in the same manner as for Pd-OEP-keton (example 2).

Complexes of the ethyoporphyrin-keton ($R_1=R_3=R_5=R_7=CH_3$, $R_2=R_4=R_6=R_8=CH_2CH_3$) are synthesized in the same manner as for Pd-OEP-keton (examples 1,2).

Synthesis of Pt and Pd complexes of CP3-keton and its tetraethyl ester. CP3 is oxidized with $OsO_4$ followed by incubation with sulfuric acid and purification, according to example 1. Thus, due to asimetric structure of CP3, ($R_1=R_3=R_5=R_8=CH_3$, $R_2=R_4=R_6=R_7=CH_2—CH_2—COOH$) the mixture of the four main isomers of CP3-keton was obtained. This mixture of isomers, which are spectrally undistinguishable, was used for preparation of Pt and Pd complexes, according to examples 1,2.

For preparation of other tetraalkyl esters of the coproporphyrin 1-keton complexes, one equivalent of Pt-CP1-keton (free acid) or Pd-CP1-keton (free acid) is dissolved in DMF. Four equivalents of N,N'-dicyclohexylcarbodiimide are added and 10 equivalents of the preferred alcohol (e.g., octadecanol for obtaining the corresponding octadecanol ester (C=18)). The tetraalkyl ester formed thereby can be purified by chromatography on an silicagel column in a chloroform/ether system.

EXAMPLE 5

Synthesis of Zinc(II) Octaethyloxoporphyrine or Octaethylporphine-Keton (ZnOEPK)

OEPK, 50 mg, is dissolved in 10 ml of chloroform, then mixed with 10 ml of methanol containing 100 mg of Zn(CH3COO)2*2H20 and heated for 15–20 minutes under reflux. Then 100 ml of water added, organic layer is separated and evaporated until dryness. The residue is dissolved in chloroform and chromatographed on A1203. The main fraction is collected, evaporated to a volume of 0.5 ml, then 10 ml of methanol are added. The crystals of ZnOEPK formed are filtered and dried in air. Yield is about 85–90%.

EXAMPLE 6

Preparation and Properties of the Platinum and Palladium Oxoporphyrin Polymer Compositions OEP-keton complex dissolved in 5% solution of polystyrene in toluene, 10 ml, mixed together to obtain true solution. The paint stored at room temperature in the dark. To prepare the phosphorescent oxygen-sensitive coating, the above paint applied onto a horizontal surface of optical element (e.g., glass slide, transparent polyester film or end of optical fibre) and left to evaporate the solvent (1–12 hours). Thus, active elements were prepared which have good mechanic properties, easily can be handled and suitable for the phosphorescent oxygen detection in liquid either gas phases. To improve the properties of the support and sensitive coating (such as, adhesion, oxygen permeability, etc.), surface pretreatment and/or plasticizers could be used.

Figure 1A:
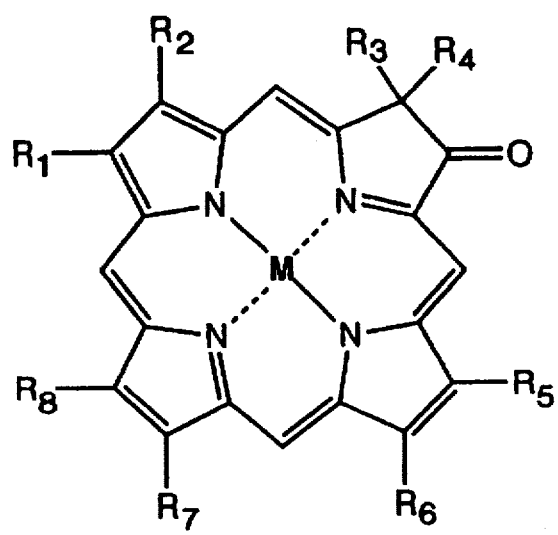
FIG. 1a shows the chemical structure of the oxoporphyrin complexes according to the present invention.
Figure 1B:
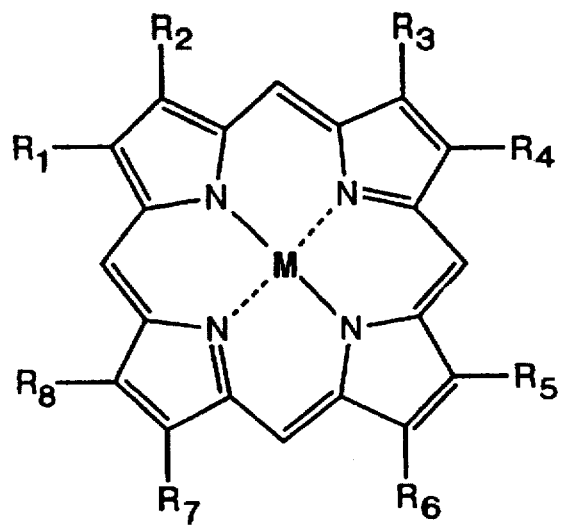
FIGS. 1b and 1c show related structures: metalloporphyrins (1b), metallochlorines (1c) each with side radicals R1 to R8 of the corresponding porphyrin.
Figure 1C:
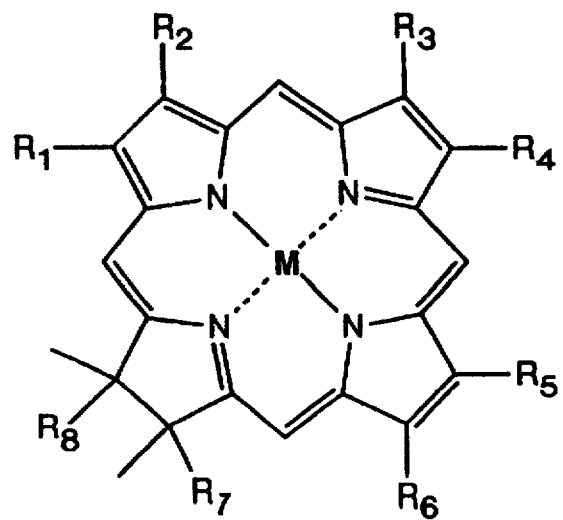
Figure 2A:
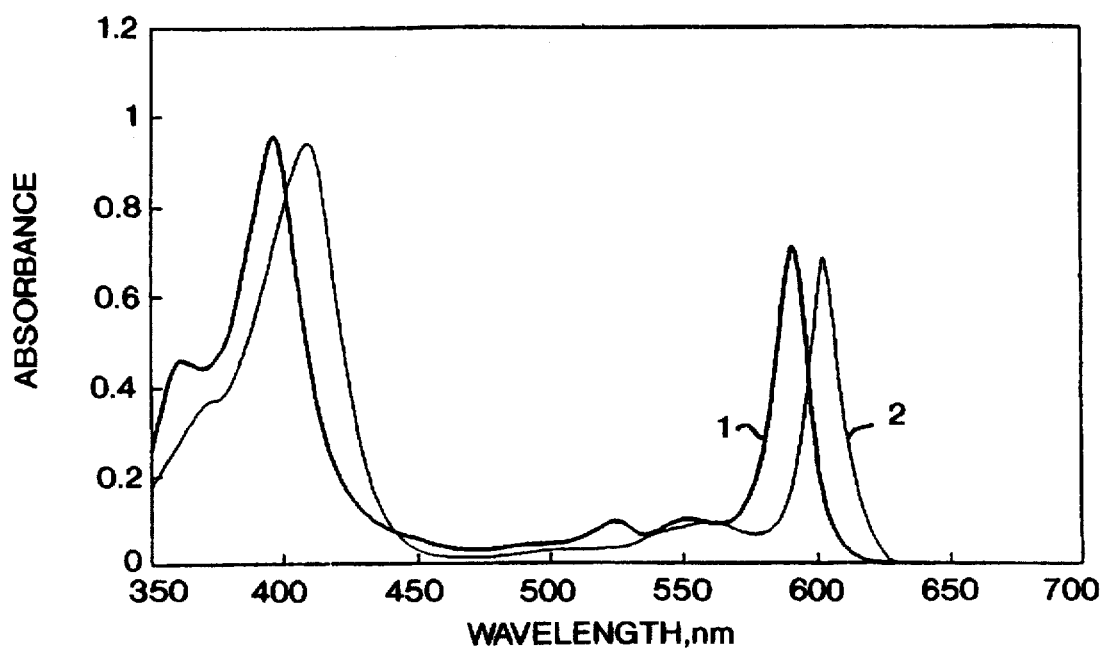
FIGS. 2a and 2b show absorbance and corrected emission spectra of platinum (1) and palladium (2) complexes of the oxoporphyrins.
Figure 2B:
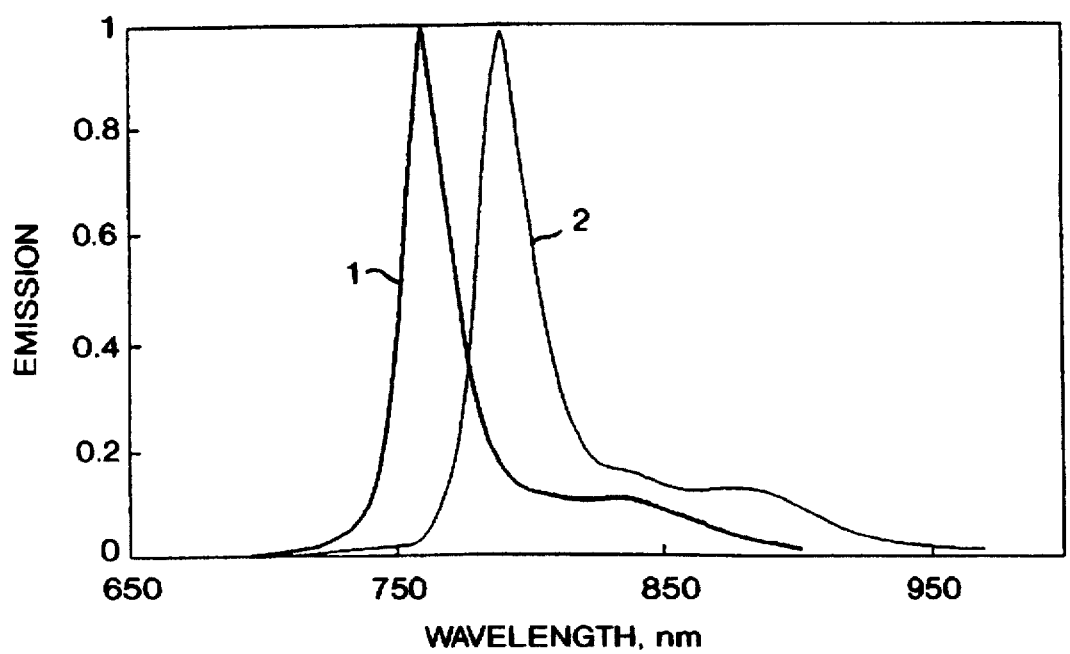

Spectra of platinum and palladium complexes of OEP and OEP-keton are presented on FIG. 2a and 2b. Corresponding complexes of CP1-keton, CP1-TEE-keton were quite identical to that of OEP-keton (see Tables 1 and 2). Phosphorescence lifetime for Pt- and Pd-complexes of OEP-keton in oxygen-free solution (1% Triton X-100 aqueous micellar solution containing 5 mg/ml of sodium sulfite, pH 7.5) were found to be about 63 us and 450 us, respectively (25° C.).

FIGS. 4a–d demonstrate phosphorescence decay curves for the polymer compositions of Pt- and Pd-OEP-ketons and polystyrene and their fitting and linearization according to single-exponential decay law. Character of the decay curve is the same for different oxygen concentrations (0–25% in air) and dye content in the polymer (range 0.1–50 mM). For these active elements phosphorescence lifetime values at zero oxygen were 63 and 460 microseconds, respectively.

Typically 1–10 µm thick phosphorescent film coatings were prepared having dye/polymer content of about 1:10–3:100. High content of the dye in the sensitive composition provide efficient absorbance of the excited light (up to 95%) and high levels of phosphorescent signal, while small thickness—fast phosphorescence response to oxygen changes. More thick film coatings are not easily permeable for oxygen and have slow response. Lower concentration of the dye result in lower phosphorescence signals (intensity), but the course of decay curve and oxygen concentration remain stable within broad ranges. The invention encompasses film coatings having thicknesses of 1 to 20 µm. When the dye is platinum octaethyloxoporphyrin, its preferred concentration is 1 to 10% of the polymer mass.

Figure 5:
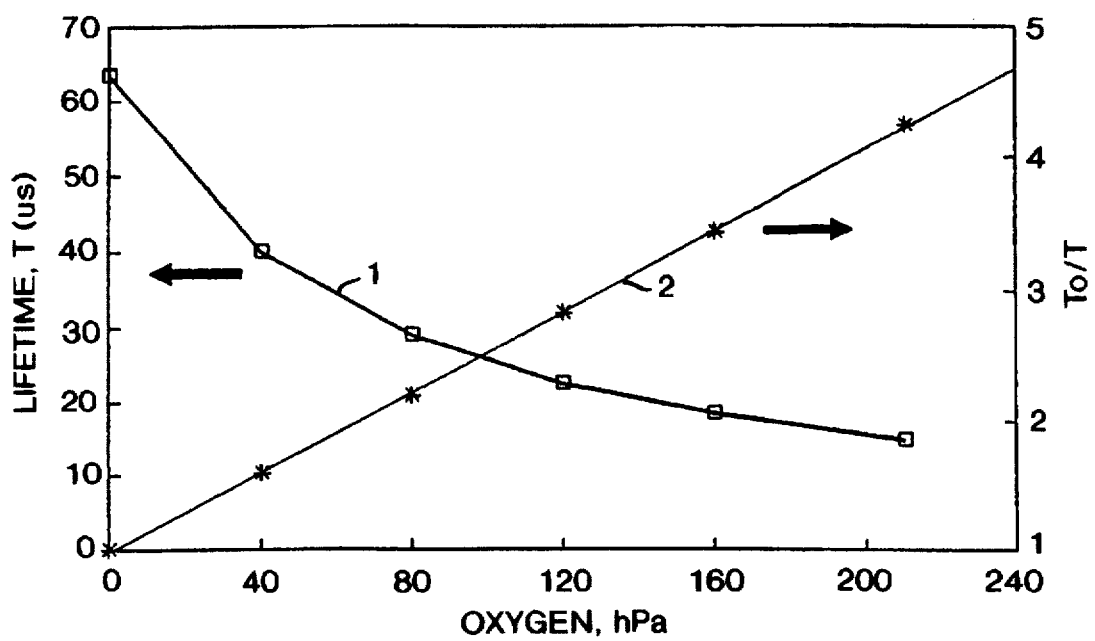
FIG. 5 shows a standard curve for quenched-phosphorescence determination of oxygen in gas phase with the platinum octaethyloxoporphyrine—polystyrene composition presented in lifetime (1) and Stern-Volmer (2) plots.

FIG. 5 shows standard curve for determination of oxygen (or air pressure) in gas phase with the Pt-OEP-keton-polystyrene coating presented both in lifetime and Stern-Volmer plots (to/t vs O2). Amplitude of changes of the phosphorescence lifetime appears to be about 4.2 times between zero oxygen and ambient air (200 hPa). Phosphorescence intensity changes and their character are just the same, i.e., true dynamic (i.e., collisional) quenching with oxygen take place in the sensitive coating.

In the very similar manner active elements on the basis of other hydrophobic dyes (Pt- and Pd-complexes of the porphyrin-ketons described above) could be prepared, their properties being also similar. Oxygen-sensitive membranes based on other polymers such as polyvinylchloride (PVC) or plasticized PVC can be prepared in a very similar way as for the polystyrene membranes.

Special surface pretreatment of the support and minor additives of plastisizers to the polymer composition can be used to improve some properties of the oxygen-sensitive coatings, such as adhesion, introduction of functional groups for further enzyme immobilization, biocompatibility.

Figure 7:
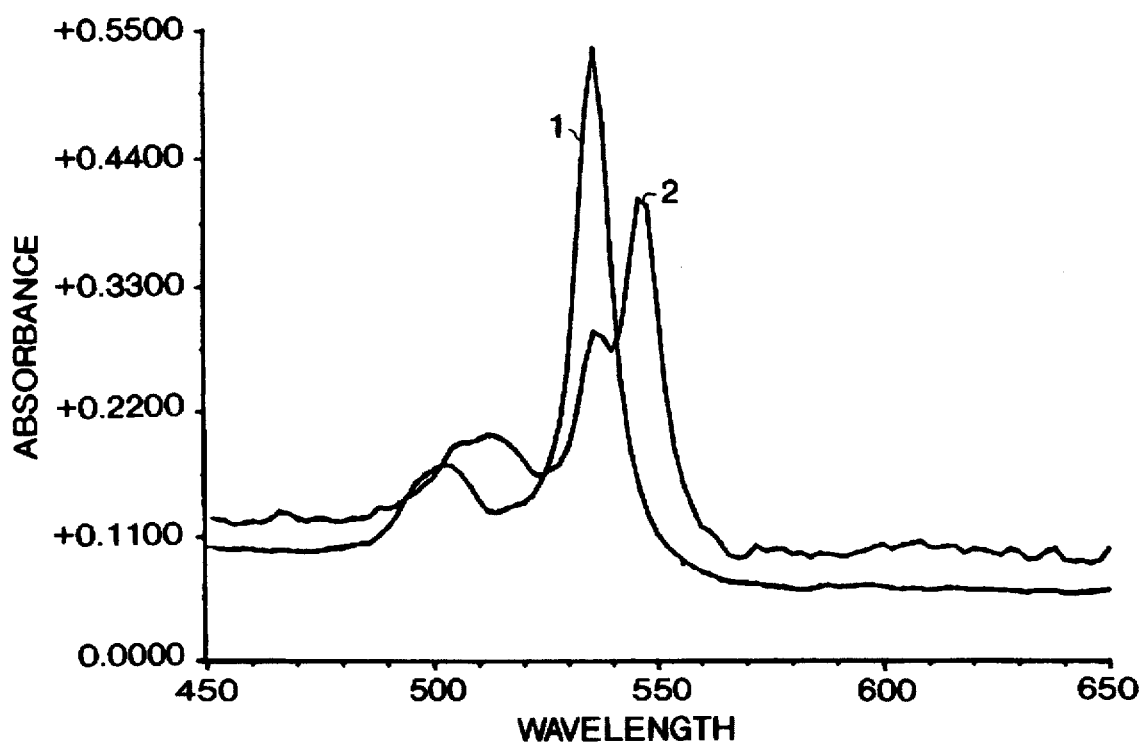
FIG. 7 shows the spectral changes in the Pt-octaethylporphine-polystyrene oxygen-sensitive coating (3 µm thick film applied onto polyester transparency film) in the course of long-term storage: (1) fresh prepared and (2) stored for 1.5 years in a dark place at room temperature.

Storage stability of the new type oxygen-sensitive coating was found to be substantially improved. FIG. 7 demonstrates the character of spectral changes for the standard PtOEP-PS coating occurred during storage at ambient temperature in the dark. These changes reflect the process of chemical degradation of the sensitive film, while the pure crystalline dyes undergo no degradation upon storage. The new sensitive coating displayed no spectral changes during storage for 1.5 year, i.e.,its long-term storage stability is rather good.

Lifetime characteristics for the PtOEP-keton/polystyrene coatings practically didn't change upon storage for at least 1.5 years, i.e., oxygen calibration curve in lifetime values have no drift. Mild sterilization with ethanol and heat sterilization at 150° C. for 90 minutes also have minor influence upon lifetime characteristics.

Table 3 summarizes comparatively stability of lifetime characteristics of the two types of oxygen-sensitiv membranes.

TABLE 3

| Storage time | Lifetime (in air), µs | |
|---|---|---|
| | PtOEP-PS | PtOEP-keton-PS |
| Freshly prepared membranes | 21.0 | 20.2 |
| Stored for 6 months | 23.5 | 20.8 |
| Stored for 1 year | 25.4 | 20.7 |
| Stored for 1, 5 years | n.d. | 21.0 |
| After sterilization with 100% ethanol | 21.8 | 20.3 |
| After heat sterilization 90 min at 150° C. | 21.5 | 20.5 |

Operational stability (i.e., photostability) of the new coating is also found to be improved. Under intense and continuous illumination (polychromatic UV-light, 18 hours in air, 22° C.) the standard coating recovered only 10% of initial dye quantified by absorbance measurements. Under the same conditions the new oxygen probe recovered 88% of the dye. So, photostability of the new sensitive coating is about 10-times better.

The active element described in Example 6 can be used for the fibre-optical oxygen detection in gas and liquid phase as follows. A prototype fibre-optic element bifurcated fibre bundle) is supplied with an active element (phosphorescent oxygen probe) on the basis of Pt-OEP-keton/polystyrene polymer film composition.

The oxygen sensor operates as follows: The oxygen membrane (disc 3 mm diameter fixed at the common end of the bifurcated fibre bundle) have diffusion contact with the analyzing sample (gas or liquid) and optical linkage with the phosphorescence detector. Optical path: light emitting diode—membrane—photodiode may have additional optical filters for excitation and emission light. The LED provides excitation of phosphorescence of the oxygen membrane in the region of efficient absorbance of the dye. A Photodiode provide efficient registration of phosphorescence emitted by the dye in red-NIR spectral area. Electric signal obtained from the photodiode is then passed through preamplifier and/or amplifier circuits and undergo, if necessary, analog/digital conversion. Electronic schemes of modulation of the light source and photodetector have feedback correction and work at a frequency of an order of 1 kHz. This provides discrimination of specific and background signals. In the lifetime-based oxygen sensing approach the phase shift between excitation light and phosphorescence is measured, thus lifetime is determined according to known equation:

$$tg\,(\alpha)=2\pi f\tau$$

α ... phase shift between excitation light and phosphorescence light f ... frequency at which the light source is modulated τ ... lifetime The described device allows to measure phosphorescence intensity and/or lifetime for the oxygen membranes and coatings and thus quantify oxygen concentration on the sample.

Figure 8:
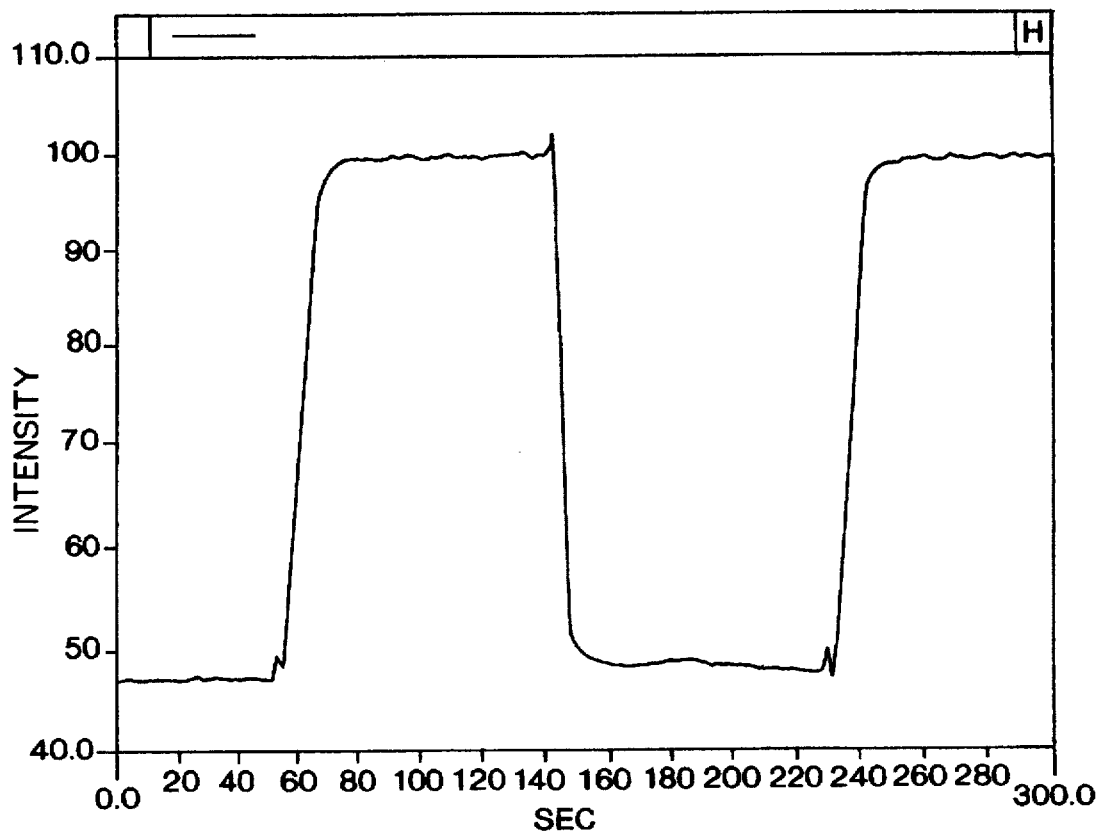
FIG. 8 shows a response of the oxygen-sensitive film towards changes in oxygen in aqueous solutions (air-saturated water and deoxygenated aqueous solution containing 10 mg/ml sodium sulfite)

FIG. 8 shows a typical curve of the phosphorescence response of the sensitive film for oxygen concentration change obtained in aqueous solution. One can see that 95% response time is about 10 sec including time of the film manipulation (transfer from air-saturated solution into deoxygenated one).

For the preparation of a glucose membrane the phosphorescent polymer composition is prepared and applied onto the polyester support as described in example 6. The oxygen membrane thus obtained is then coated with glucose oxidase enzyme as follows. The enzyme, 50 mg, is dissolved in 1 ml of water and the glutaraldehyde added to give final concentration 0.2% (v/v). The solution is applied onto the surface of oxygen membrane covering about 25 cm² and left to dry in air (1–3 hours). The glucose oxydase membranes thus obtained stored at 4° C. dry or in phosphate buffer containing 0.1% sodium azide.

Figure 9:
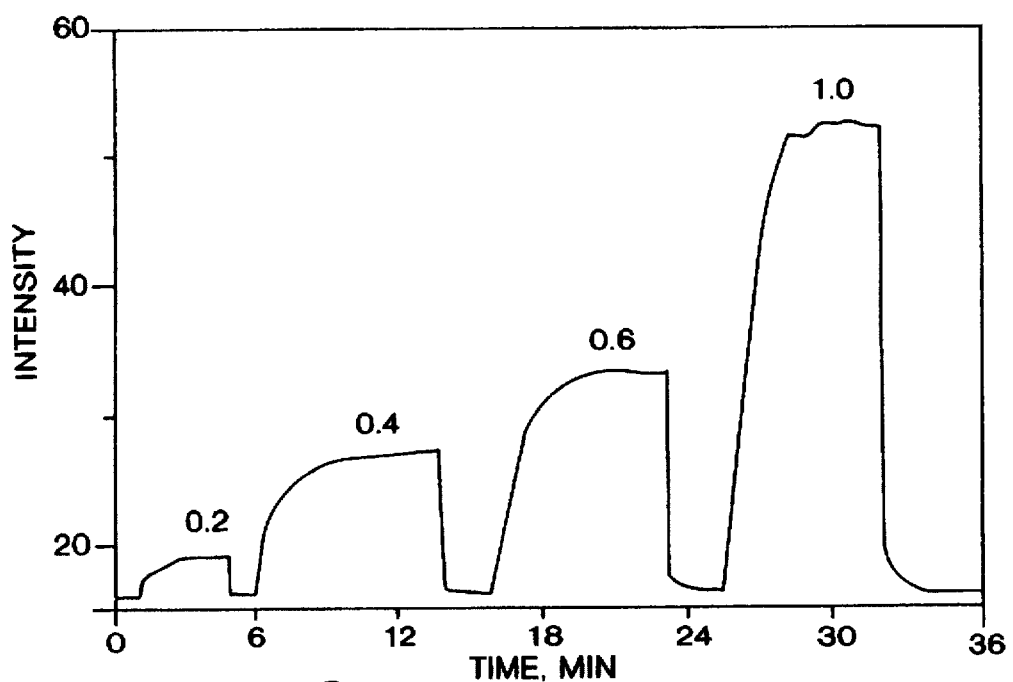
FIG. 9 shows a response of the fibre-optic membrane-type glucose oxidase biosensor to different glucose standard solutions: 0.2; 0.4; 0.6 and 1 mM glucose.
Figure 10:
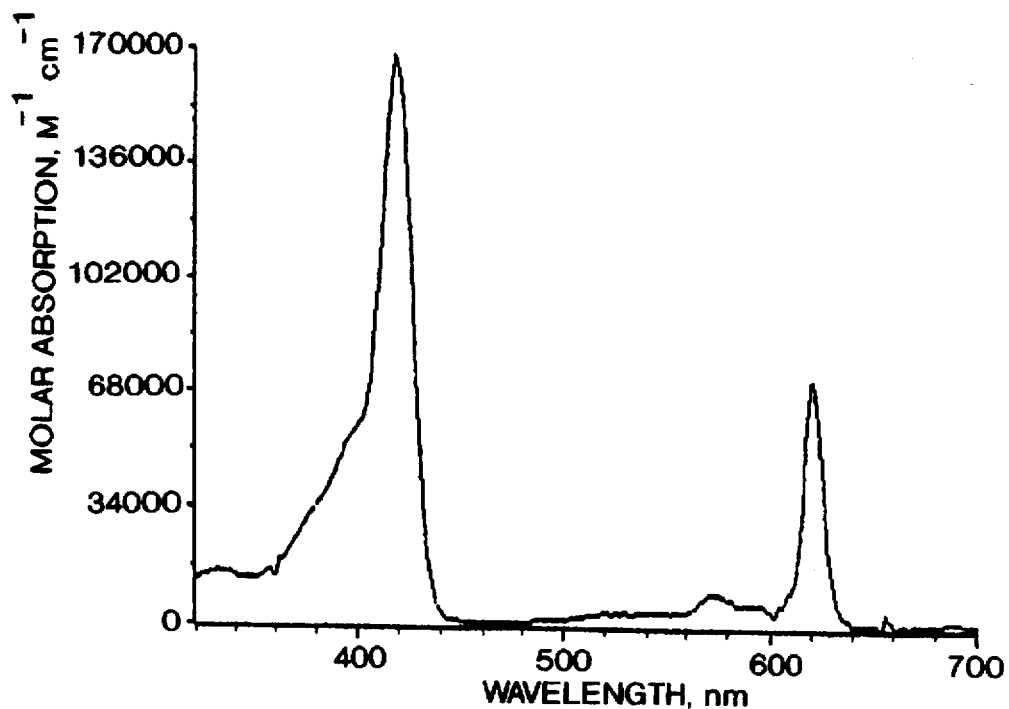
FIGS. 10 and 11 show absorbance (molar extinction scale) and (not corrected) fluorescence emission spectra of zinc(II) octaethyloxoporphyrine in chloroform.
Figure 13:
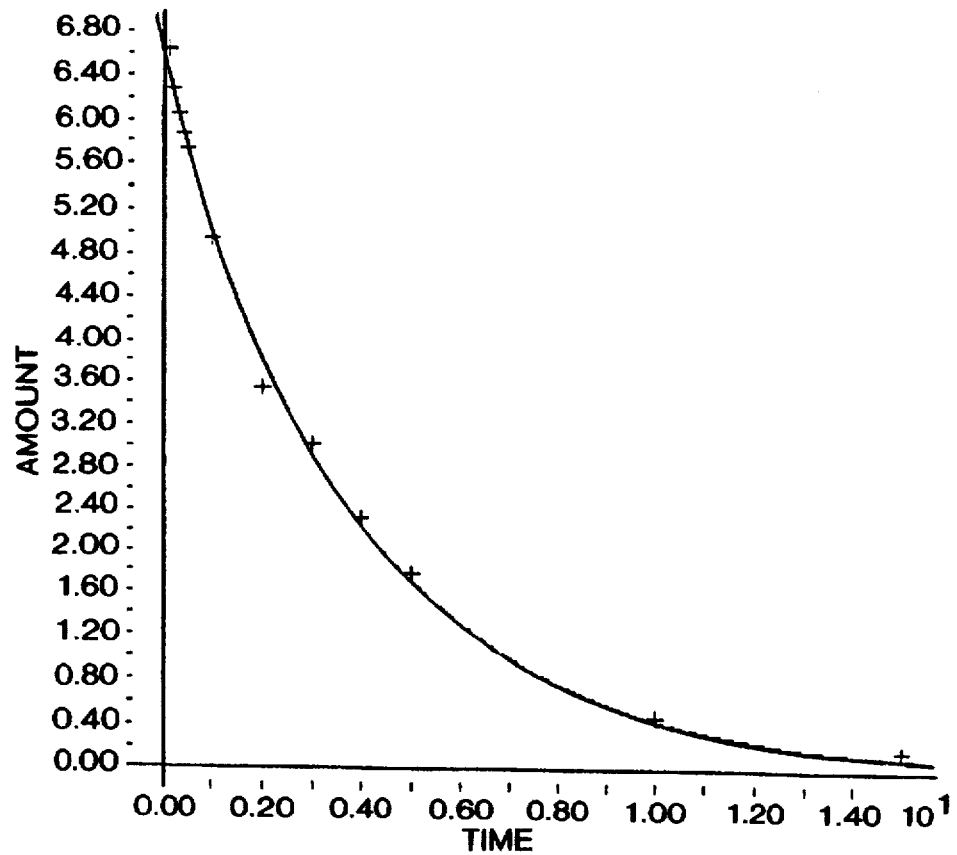
FIG. 13 shows the luminescence decay curve of zinc(II) octaethyloxoporphyrine in micellar sulfite solution (Ecitation: 422 nm; emission: 626 nm; slits: 15 nm).
Figure 11:
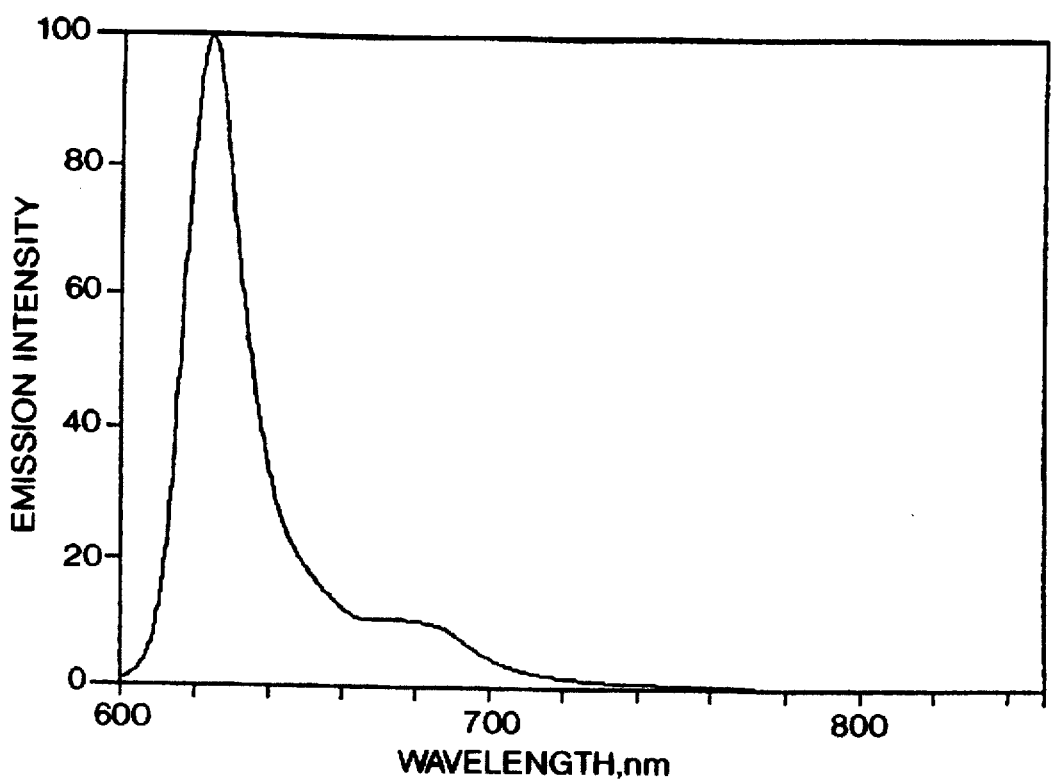
Figure 12:
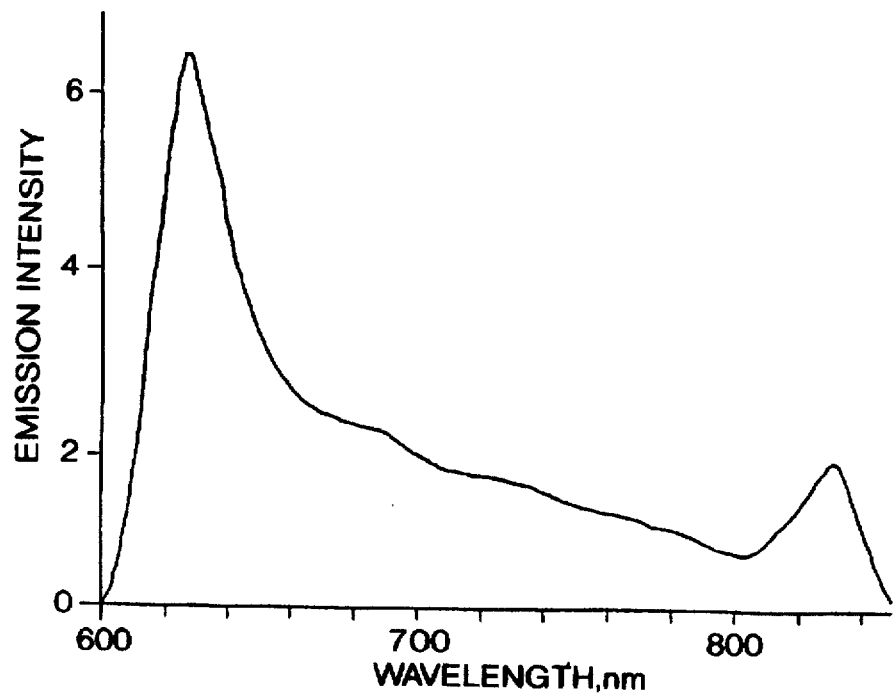
FIG. 12 shows the time-resolved emission spectrum (not corrected) of zinc(II) octaethyloxoporphyrine in micellar sulfite solution at 25° C. (delay time: 0.05 ms; gate time: 10 ms; excitation: 422 nm)

For glucose detection the same phosphorescence detector is used, but the glucose oxidase membrane is used instead of the oxygen membrane as an active element. All measurements are performed in air-saturated phosphate buffer, pH 7.0 at ambient temperature. The active element of the fibre-optic sensor is dipping into glucose solution and signal changes monitored. Typical curve of the phosphorescence signal response to glucose is presented on FIG. 9. The final signal response obtaining in the glucose sample (steady-state signal after stabilization, 2–10 minutes) is used for quantification These final response values (intensity or lifetime) are used for calibration with glucose standards and further glucose quantification in unknown samples.

Thus, the above-described new phosphorescent dyes, active elements on their basis and method for measuring oxygen concentration enables precise quantitative measurements of oxygen and a number of important metabolites using simple reagent, methodical and instrumental base.

We claim:

1. Luminescent dye comprising a metallocomplex of an oxoporphyrin having a general formula:

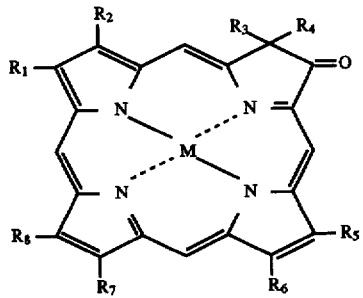

wherein R1 to R8 are radicals belonging to the group consisting of: H, lower alkyl (number of C≦6) or $CH_2$—$CH_2$—COO—$R_9$, with $R_9$=H or alkyl (number of C≦18) and M=$Pt^{2+}$ or $Pd^{2+}$.

2. The dye according to claim 1, wherein R1 to R8=ethyl.

3. The dye according to claim 1, wherein $R_1$=$R_3$=$R_5$=$R_7$= methyl and $R_2$=$R_4$=$R_6$=$R_8$=$CH_2$—$CH_2$—COO—$R_9$, with $R_9$=H or alkyl (number of C≦18).

4. The dye according to claim 1, wherein $R_1$=$R_3$=$R_5$=$R_7$= methyl and $R_2$=$R_4$=$R_6$=$R_8$=$CH_2$—$CH_3$.

5. The dye according to claim 1, wherein $R_1$=$R_3$=$R_5$=$R_8$= methyl and $R_2$=$R_4$=$R_6$=$R_7$=$CH_2$—$CH_2$—COO—$R_9$, with $R_9$=H or alkyl (number of C≦18).

6. Active element for optical determination of oxygen in liquid and gaseous media comprising a composition prepared from at least one oxygen-permeable polymer and at least one luminescent dye distributed in said oxygen-permeable polymer, said polymer having a mass, wherein said luminescent dye is a metallocomplex of the oxoporphyrins having the general formula:

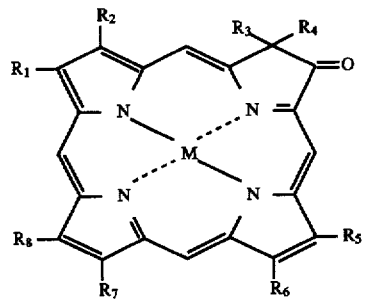

wherein R1 to R8 are radicals belonging to a group consisting of: H, lower alkyl (number of C≦6) or $CH_2$—$CH_2$—COO—$R_9$, with $R_9$=H or alkyl (number of C≦18) and M=$Pt^{2+}$ or $Pd^{2+}$ or $Zn^{2+}$.

7. The active element according to claim 6, wherein said dye is platinum octaethyloxoporphyrin having a concentration of 1–10% of said polymer mass.

8. The active element according to claim 6, wherein said dye is palladium octaethyloxoporphyrin.

9. The active element according to claim 6, wherein said dye is zinc octaethyloxoporphyrin.

10. The active element according to claim 6, wherein said active element is prepared in the form of a film having 1–20 μm thickness.

11. The active element according to claim 10, wherein said film is applied onto a suitable solid support or optical element.

12. The active element according to claim 6, wherein said active element is additionally covered with a layer of a certain oxygen-dependent enzyme.

13. The active element according to claim 6, wherein said oxygen-permeable polymer is polystyrene.

14. Method for measuring oxygen concentration, including the following steps:

using a sensitive element comprising an oxygen-permeable polymer with a distributed luminescent dye having the general formula:

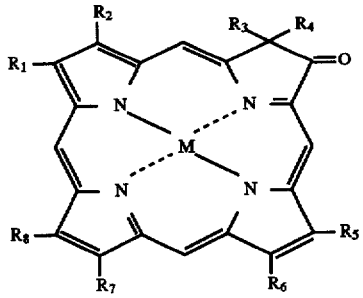

wherein R1 to R8 are radicals belonging to a group consisting of: H, lower alkyl (number of C≦6) or $CH_2$—$CH_2$—COO—$R_9$, with $R_9$=H or alkyl (number of C≦18) and M=$Pt^{2+}$ or $Pd^{2+}$ or $Zn^{2+}$;

bringing said element into contact with a sample to be analyzed;

exciting said sensitive element with an exciting wavelength optimum between 570 and 650 nm;

measuring an emission wavelength optimum between 700 and 850 nm;

calculating the lifetime value of the luminescent decay of said luminescent dye, and deriving the oxygen concentration from said lifetime value.

15. The method according to claim 14, wherein said sensitive element is linked to a luminescent detector, having its optimum between 700 and 850 nm, by means of fibre optics and wherein excitation is performed with a LED having emission optimum between 570 and 650 mm.

16. The method according to claim 14, wherein said luminescent measurement is performed in pulsed mode with time resolution.

17. The method for measuring oxygen concentration, including the following steps:

using a sensitive element comprising an oxygen-permeable polymer with a distributed luminescent dye having the general formula:

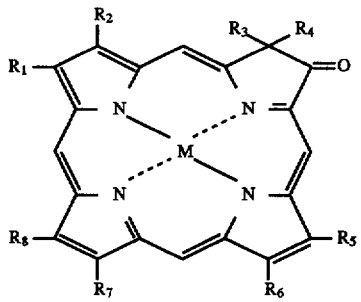

wherein R1 to R8 are radicals belonging to a group consisting of: H, lower alkyl (number of $C \leq 6$) or $CH_2-CH_2-COO-R_9$, with $R_9=H$ or alkyl (number of $C \leq 18$) and $M=Pt^{2+}$ or $Pd^{2+}$ or $Zn^{2+}$;

bringing said element into contact with a sample to be analyzed;

exciting said sensitive element with an exciting wavelength optimum between 570 and 650 nm;

measuring an emission wavelength optimum between 700 and 850 nm;

calculating the intensity value of said luminescence dye, and deriving the oxygen concentration from said intensity value.

18. The method according to claim 17, wherein said sensitive element is linked to a luminescent detector, having its optimum between 700 and 850 nm, by means of fibre optics and wherein excitation is performed with a LED having emission optimum between 570 and 650 nm.

19. The active element according to claim 6, wherein said oxygen-permeable polymer is polyvinylchloride.

20. The active element according to claim 6, wherein said oxygen-permeable polymer is plasticized polyvinylchloride.

* * * * *

UNITED STATES PATENT AND TRADEMARK OFFICE
CERTIFICATE OF CORRECTION

PATENT NO. : 5,718,842
DATED : February 17, 1998
INVENTOR(S) : PAPKOVSKY et al.

It is certified that error appears in the above-indentified patent and that said Letters Patent is hereby corrected as shown below:

On the title page;
In the heading, correct item 73:

[73] Assignee: Joanneum Research Forschungsgesellschaft mbH, Graz, Austria

Signed and Sealed this

Fifth Day of May, 1998

Attest:

BRUCE LEHMAN

*Attesting Officer*  *Commissioner of Patents and Trademarks*